United States Patent
Wu (10) Patent No.: US 11,921,580 B2
(45) Date of Patent: Mar. 5, 2024

(54) REDUNDANT MULTIPORT MEMORY FOR VEHICLE APPLICATIONS

(71) Applicant: Micron Technology, Inc., Boise, ID (US)

(72) Inventor: Minjian Wu, Shanghai (CN)

(73) Assignee: Micron Technology, Inc., Boise, ID (US)

(*) Notice: Subject to any disclaimer, the term of this patent is extended or adjusted under 35 U.S.C. 154(b) by 0 days.

(21) Appl. No.: 17/860,772

(22) Filed: Jul. 8, 2022

(65) Prior Publication Data
US 2024/0012711 A1 Jan. 11, 2024

(51) Int. Cl.
*G11C 29/00* (2006.01)
*G06F 11/07* (2006.01)
*G06F 11/10* (2006.01)
*G06F 11/14* (2006.01)

(52) U.S. Cl.
CPC ...... *G06F 11/1068* (2013.01); *G06F 11/0787* (2013.01); *G06F 11/1451* (2013.01)

(58) Field of Classification Search
CPC .............. G06F 11/1068; G06F 11/1451; G06F 11/0787
See application file for complete search history.

(56) References Cited

U.S. PATENT DOCUMENTS

| 9,904,595 | B1* | 2/2018 | Jalan | G06F 11/1048 |
| 2015/0127983 | A1* | 5/2015 | Trobough | G06F 11/2733 |
| | | | | 714/30 |
| 2018/0060163 | A1* | 3/2018 | Jalan | G06F 11/1012 |
| 2020/0062264 | A1* | 2/2020 | Stein | B60G 17/0165 |
| 2020/0192722 | A1* | 6/2020 | Lenz | G06F 9/5077 |
| 2022/0009518 | A1* | 1/2022 | Malach | G06N 3/02 |

FOREIGN PATENT DOCUMENTS

| EP | 3504624 A1 * | 7/2019 | .......... G06F 11/1012 |
| WO | WO-2022226511 A1 * | 10/2022 | |

OTHER PUBLICATIONS

Compute Express Link (CXL) Specification, Revision 2.0, Version 1.0, Compute Express Link Consortium Inc., Oct. 26, 2020, 628 pages.

* cited by examiner

*Primary Examiner* — Samir W Rizk
(74) *Attorney, Agent, or Firm* — Brooks, Cameron & Huebsch, PLLC (57) ABSTRACT

A redundant multiport memory for vehicle applications can have different ports coupled to different hosts that are configured to provide advanced driver assistance system (ADAS) for the vehicle. Different multiport memory devices can provide primary or secondary storage of data for the hosts. At least one of the hosts can perform a functionality check on at least one of the multiport memory devices and make use of a second multiport memory device to which it is coupled if a first multiport memory device to which it is coupled fails the check.

20 Claims, 6 Drawing Sheets

REDUNDANT MULTIPORT MEMORY FOR VEHICLE APPLICATIONS

TECHNICAL FIELD

The present disclosure relates generally to semiconductor memory and methods, and more particularly, to apparatuses, systems, and methods for redundant multiport memory for vehicle applications.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

Vehicles are becoming more dependent upon memory sub-systems to provide storage for components that were previously mechanical, independent, or non-existent. A vehicle can include a computing system, which can be a host for a memory sub-system. The computing system can run applications that provide component functionality. The vehicle may be driver operated, driver-less (autonomous), and/or partially autonomous. The memory device can be used heavily by the computing system in a vehicle.

BRIEF DESCRIPTION OF THE DRAWINGS

The present disclosure will be understood more fully from the detailed description given below and from the accompanying drawings of various embodiments of the disclosure.

DETAILED DESCRIPTION

Aspects of the present disclosure are directed to redundant multiport memory for vehicle applications. The function and safety of vehicle systems is important, particularly for advanced driver assistance systems (ADAS). According to some previous approaches, one or more ADAS can be implemented by each of a number of different hosts, where each host is coupled to memory devices to provide primary and secondary storage. The hosts may be able to communicate with each other, but each host typically has its own memory that is not shared directly with other hosts. For example, each host may have a first port comprising a double data rate interface for primary storage with a volatile memory device and a second port comprising an embedded multi-media controller interface, a universal flash storage interface, or a non-volatile memory express interface for secondary storage with a non-volatile memory device.

Such previous approaches may have limitations such as ADAS outages if a corresponding memory device is not functional. For example, if the primary storage device for an ADAS host becomes damages, the ADAS host may not function. As another example, if the secondary storage device for the ADAS host becomes damaged or critical data is lost, then the ADAS host may not be able to provide its desired functionality. As another example, in a system with two ADAS hosts, if the processor in a first ADAS host fails and the primary storage in the second ADAS host fails, then the entire system may fail and not be able to provide the functionality of either ADAS.

Aspects of the present disclosure address the above and other deficiencies by using multiport primary storage and multiport secondary storage memory devices for redundant memory design in a vehicle system. Each ADAS host, which may be a system-on-chip (SOC) can connect to more than one primary storage memory device and more than one secondary storage memory device through different ports in those memory devices. More than one ADAS host shares the multiport memory devices to enhance the reliability, functionality, and safety of the vehicle system. For example, if one memory device fails, the system can still function because the ADAS host that uses that memory device can use a different memory device (e.g., a memory device intended to be used by a different ADAS host such that two different ADAS hosts are using the same memory device, albeit via different ports of the memory device). The multiport memory setup also allows for convenient data backup for an ADAS host to different physical memory devices directly via different ports (e.g., instead of transferring the data to a different ADAS host first).

The figures herein follow a numbering convention in which the first digit or digits correspond to the drawing figure number and the remaining digits identify an element or component in the drawing. Similar elements or components between different figures may be identified by the use of similar digits. For example, 114 may reference element "14" in FIG. 1, and a similar element may be referenced as 214 in FIG. 2. Analogous elements within a Figure may be referenced with a hyphen and extra numeral or letter. Such analogous elements may be generally referenced without the hyphen and extra numeral or letter. For example, elements 106-1, 106-2, . . . , 106-N in FIG. 1 may be collectively referenced as 106. As used herein, the designator "N", particularly with respect to reference numerals in the drawings, indicates that a number of the particular feature so designated can be included. As will be appreciated, elements shown in the various embodiments herein can be added, exchanged, and/or eliminated so as to provide a number of additional embodiments of the present disclosure. In addition, as will be appreciated, the proportion and the relative scale of the elements provided in the figures are intended to illustrate certain embodiments of the present invention and should not be taken in a limiting sense.

Figure 1:
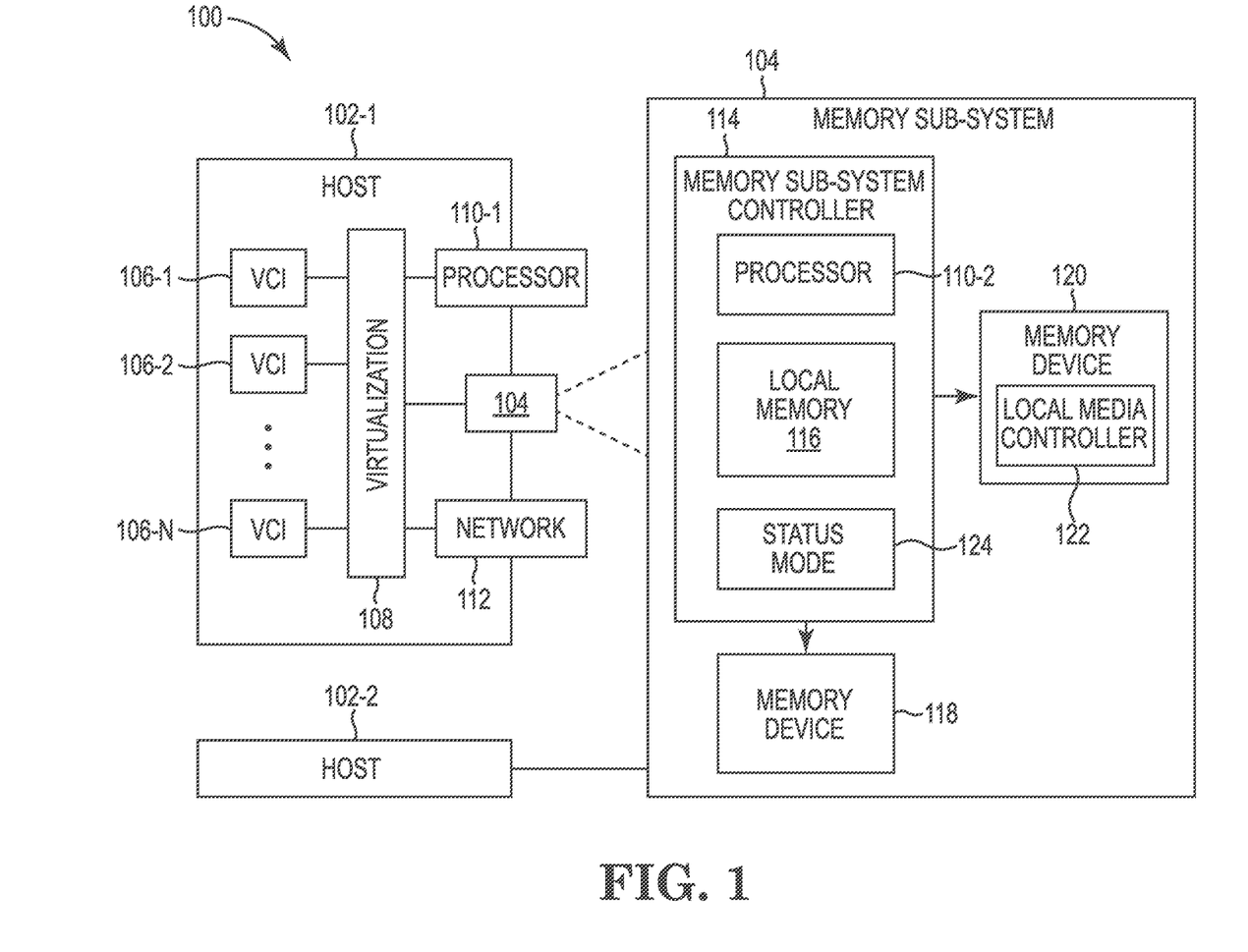
FIG. 1 is a block diagram of an example computing system that includes a memory sub-system in accordance with some embodiments of the present disclosure.

FIG. 1 is a block diagram of an example computing system 100 that includes a memory sub-system 104 in accordance with some embodiments of the present disclosure. The memory sub-system 104 can include media, such as one or more volatile memory devices 118, one or more non-volatile memory devices 120, or a combination thereof.

The volatile memory devices 118 can be, but are not limited to, random access memory (RAM), such as dynamic random access memory (DRAM), synchronous dynamic random access memory (SDRAM), and resistive DRAM (RDRAM).

A memory sub-system 104 can be a storage device, a memory module, or a hybrid of a storage device and memory module. Examples of a storage device include an SSD, a flash drive, a universal serial bus (USB) flash drive, an embedded Multi-Media Controller (eMMC) drive, a Universal Flash Storage (UFS) drive, a secure digital (SD) card, and a hard disk drive (HDD). In at least one embodiment, the memory sub-system 104 is an automotive grade SSD. Examples of memory modules include a dual in-line memory module (DIMM), a small outline DIMM (SO-DIMM), and various types of non-volatile dual in-line memory module (NVDIMM).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 includes host systems 102-1, 102-2 that are coupled to one or more memory sub-systems 104. In some embodiments, the host systems 102 are coupled to different types of memory sub-systems 104. FIG. 1 illustrates an example of a first host system 102-1 coupled to the memory sub-system 104, where the first host system 102-1 is illustrated in more detail than the second host system 102-2 for ease of illustration. The second host system 102-2 is also coupled to the memory sub-system 104. As used herein, "coupled to" or "coupled with" generally refers to a connection between components, which can be an indirect communicative connection or direct communicative connection (e.g., without intervening components), whether wired or wireless, including connections such as electrical, optical, magnetic, and the like.

The host systems 102 include or are coupled to processing resources, memory resources, and network resources. As used herein, "resources" are physical or virtual components that have a finite availability within a computing system 100. For example, the processing resources include a processing device 110-1 (or a number of processing devices), the memory resources include memory sub-system 104 for secondary storage and main memory devices (not specifically illustrated) for primary storage, and the network resources include as a network interface 112. The processing device 110-1 can be one or more processor chipsets, which can execute a software stack. The processing device 110-1 can include one or more cores, one or more caches, a memory controller (e.g., NVDIMM controller), and a storage protocol controller (e.g., PCIe controller, SATA controller, etc.). The host systems 102 uses the memory sub-system 104, for example, to write data to the memory sub-system 104 and read data from the memory sub-system 104.

The host systems 102 can be configured to provide virtualized or non-virtualized access to the memory sub-system 104 and/or the processing resources and network resources. Virtualization can include abstraction, pooling, and automation of the processing, memory, and/or network resources. FIG. 1 generally illustrates the host systems 102 providing virtualized access.

To provide such virtualization, the host system 102-1 incorporates a virtualization layer 108 (e.g., hypervisor, virtual machine monitor, etc.) that can execute a number of virtual computing instances (VCIs) 106-1, 106-2, . . . , 106-N. The virtualization layer 108 can provision the VCIs 106 with processing resources and memory resources and can facilitate communication for the VCIs 106 via the network interface 112. The virtualization layer 108 represents an executed instance of software run by the host system 102. The term "virtual computing instance" covers a range of computing functionality. VCIs may include non-virtualized physical hosts, virtual machines (VMs), and/or containers. Containers can run on a host operating system without a hypervisor or separate operating system, such as a container that runs within Linux. A container can be provided by a virtual machine that includes a container virtualization layer (e.g., Docker). A VM refers generally to an isolated end user space instance, which can be executed within a virtualized environment. Other technologies aside from hardware virtualization can provide isolated application instances may also be referred to as VCIs. The term "VCI" covers these examples and combinations of different types of VCIs, among others.

VMs, in some embodiments, operate with their own guest operating systems on the host system 102 using the resources of the host virtualized by the virtualization layer 108. The tenant (i.e., the owner of the VM) can choose which applications to operate on top of the guest operating system. Some containers, on the other hand, are constructs that run on top of a host operating system without the need for a hypervisor or separate guest operating system. The host operating system can use name spaces to isolate the containers from each other and therefore can provide operating-system level segregation of the different groups of applications that operate within different containers. This segregation is akin to the VM segregation that may be offered in hypervisor-virtualized environments that virtualize system hardware, and thus can be viewed as a form of virtualization that isolates different groups of applications that operate in different containers. Such containers may be more lightweight than VMs.

The VCIs 106 can therefore represent applications that run on the virtualization layer 108 or on an operating system executed by the host system 102. By way of example, the first VCI 106-1 is an application that provides an instrument cluster for a vehicle, the second VCI 106-2 is an application that provides a black box for the vehicle, and the third VCI 106-N is an application that provides an infotainment system for the vehicle. Embodiments are not limited to these specific examples of applications.

The host systems 102 can be coupled to the memory sub-system 104 via a physical host interface. Examples of a physical host interface include, but are not limited to, a serial advanced technology attachment (SATA) interface, a PCIe interface, universal serial bus (USB) interface, Fibre Channel, Serial Attached SCSI (SAS), Small Computer System Interface (SCSI), a double data rate (DDR) memory bus, a dual in-line memory module (DIMM) interface (e.g., DIMM socket interface that supports Double Data Rate (DDR)), Open NAND Flash Interface (ONFI), Double Data Rate (DDR), Low Power Double Data Rate (LPDDR), or any other interface. The physical host interface can be used to transmit data between the host systems 102 and the memory sub-system 104. The host systems 102 can further utilize an NVM Express (NVMe) interface to access the non-volatile memory devices 120 when the memory sub-system 104 is coupled with the host systems 102 by the PCIe interface. The physical host interface can provide an interface for passing control, address, data, and other signals between the memory sub-system 104 and the host systems 102. FIG. 1 illustrates a memory sub-system 104 as an example. In general, the host systems 102 can access multiple memory sub-systems via a same communication connection, multiple separate communication connections, and/or a combination of communication connections.

The host systems 102 can send requests to the memory sub-system 104, for example, to store data in the memory sub-system 104 or to read data from the memory sub-system 104. The data to be written or read, as specified by a host request, is referred to as "host data." A host request can include logical address information. The logical address information can be a logical block address (LBA), which may include or be accompanied by a partition number. The logical address information is the location the host system associates with the host data. The logical address information can be part of metadata for the host data. The LBA may also correspond (e.g., dynamically map) to a physical address, such as a physical block address (PBA), that indicates the physical location where the host data is stored in memory.

An example of non-volatile memory devices 120 include not-and (NAND) type flash memory. NAND type flash memory includes, for example, two-dimensional NAND (2D NAND) and three-dimensional NAND (3D NAND). The non-volatile memory devices 120 can be other types of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, electrically erasable programmable read-only memory (EEPROM), and three-dimensional cross-point memory. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased.

Each of the non-volatile memory devices 120 can include one or more arrays of memory cells. One type of memory cell, for example, single level cells (SLC) can store one bit per cell. Other types of memory cells, such as multi-level cells (MLCs), triple level cells (TLCs), quad-level cells (QLCs), and penta-level cells (PLCs) can store multiple bits per cell. In some embodiments, each of the non-volatile memory devices 120 can include one or more arrays of memory cells such as SLCs, MLCs, TLCs, QLCs, or any combination of such. In some embodiments, a particular memory device can include an SLC portion, and an MLC portion, a TLC portion, a QLC portion, or a PLC portion of memory cells. The memory cells of the non-volatile memory devices 120 can be grouped as pages that can refer to a logical unit of the memory device used to store data. With some types of memory (e.g., NAND), pages can be grouped to form blocks.

The memory sub-system controller 114 (or controller 114 for simplicity) can communicate with the non-volatile memory devices 120 to perform operations such as reading data, writing data, erasing data, and other such operations at the non-volatile memory devices 120. The memory sub-system controller 114 can include hardware such as one or more integrated circuits and/or discrete components, a buffer memory, or a combination thereof. The hardware can include a digital circuitry with dedicated (i.e., hard-coded) logic to perform the operations described herein. The memory sub-system controller 114 can be a microcontroller, special purpose logic circuitry (e.g., a field programmable gate array (FPGA), an application specific integrated circuit (ASIC), etc.), or other suitable circuitry.

The memory sub-system controller 114 can include a processing device 110-2 (e.g., a processor) configured to execute instructions stored in local memory 116. In the illustrated example, the local memory 116 of the memory sub-system controller 114 is an embedded memory configured to store instructions for performing various processes, operations, logic flows, and routines that control operation of the memory sub-system 104, including handling communications between the memory sub-system 104 and the host systems 102.

In some embodiments, the local memory 116 can include memory registers storing memory pointers, fetched data, etc. The local memory 116 can also include ROM for storing micro-code, for example. While the example memory sub-system 104 in FIG. 1 has been illustrated as including the memory sub-system controller 114, in another embodiment of the present disclosure, a memory sub-system 104 does not include a memory sub-system controller 114, and can instead rely upon external control (e.g., provided by an external host, or by a processor or controller separate from the memory sub-system 104).

In general, the memory sub-system controller 114 can receive information or operations from the host system 102 and can convert the information or operations into instructions or appropriate information to achieve the desired access to the non-volatile memory devices 120 and/or the volatile memory devices 118. The memory sub-system controller 114 can be responsible for other operations such as media management operations (e.g., wear leveling operations, garbage collection operations, defragmentation operations, read refresh operations, etc.), error detection and/or correction operations, encryption operations, caching operations, and address translations between a logical address (e.g., logical block address) and a physical address (e.g., physical block address) associated with the non-volatile memory devices 120. The memory sub-system controller 114 can further include host interface circuitry to communicate with the host systems 102 via the physical host interface. The host interface circuitry can convert a query received from the host systems 102 into a command to access the non-volatile memory devices 120 and/or the volatile memory devices 118 as well as convert responses associated with the non-volatile memory devices 120 and/or the volatile memory devices 118 into information for the host systems 102.

In some embodiments, the non-volatile memory devices 120 include a local media controller 122 that operates in conjunction with memory sub-system controller 114 to execute operations on one or more memory cells of the memory devices 120. An external controller (e.g., memory sub-system controller 114) can externally manage the non-volatile memory device 120 (e.g., perform media management operations on the memory device 120). In some embodiments, a memory device 120 is a managed memory device, which is a raw memory device combined with a local controller (e.g., local controller 122) for media management within the same memory device package. An example of a managed memory device is a managed NAND device.

In at least one embodiment, the block labeled "status/mode" 124 represents a status and/or mode register 124. In some embodiments, the status/mode circuitry 124 can comprise an ASIC. The status/mode circuitry 124 can be readable via the host interface. In some embodiments, a local media controller 122 of the non-volatile memory devices 120 includes at least a portion of the status/mode circuitry 124. The local media controller 122 can include a processor (e.g., processing device) configured to execute instructions stored on the volatile memory devices 118 for performing the operations described herein. In some embodiments, the status/mode circuitry 124 is part of the host systems 102, an application, or an operating system. In at least one embodiment, the block labeled "status/mode" 124 represents data or instructions stored in the memory sub-system 104. The functionality described with respect to the status/mode circuitry 124 can be embodied in machine-readable and executable instructions stored in a tangible machine-readable medium.

Figure 3:
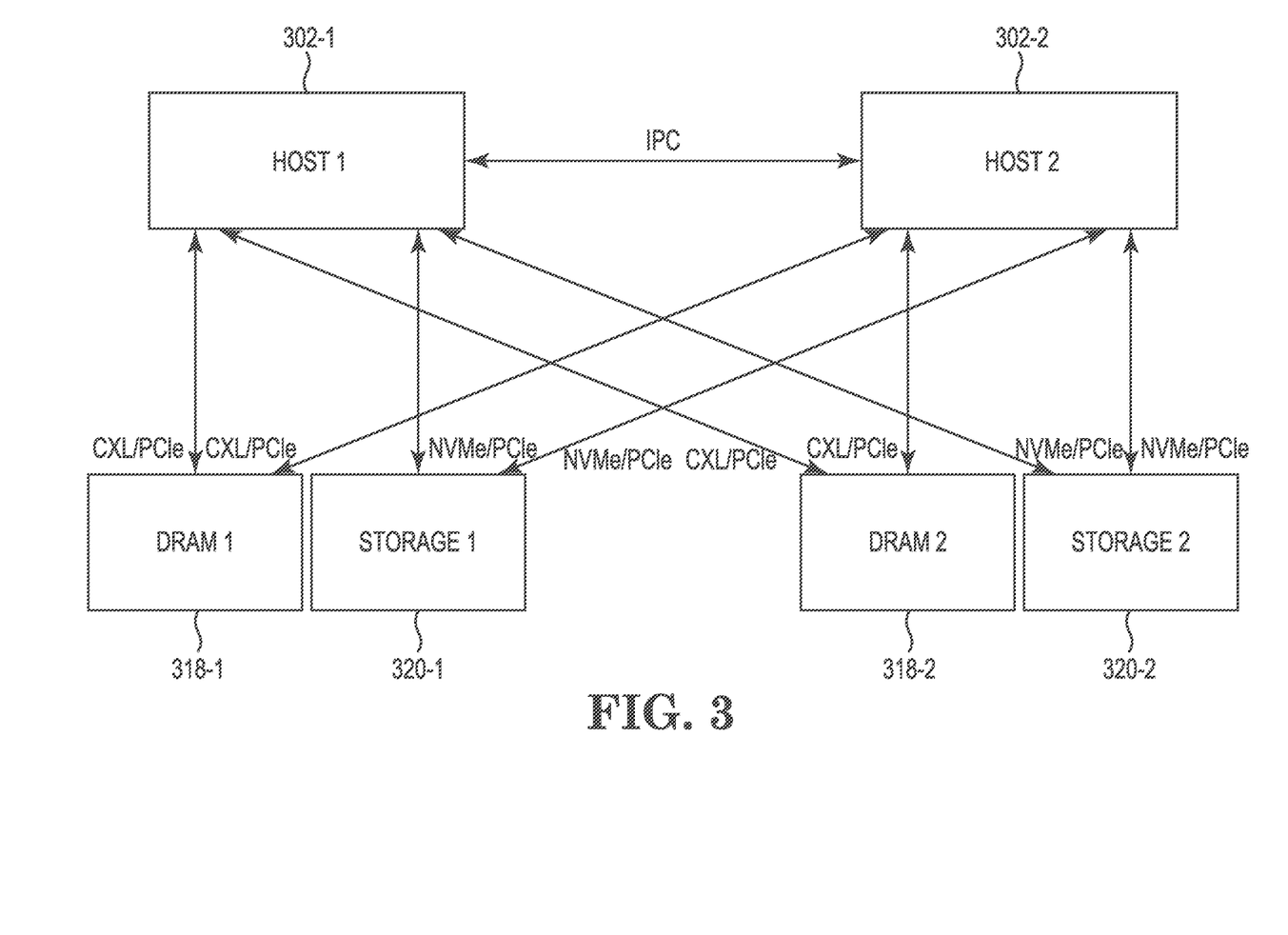
FIG. 3 is a block diagram of an example of a system including multiple hosts and multiple memory devices in accordance with some embodiments of the present disclosure.

In some embodiments, the memory sub-system 104 can represent discrete memory devices having multiple ports for being coupled to multiple hosts 102 as described in more detail with respect to FIG. 3. The memory sub-system 104 can also include additional circuitry or components that are not illustrated. In some embodiments, the memory sub-system 104 can include a cache or buffer (e.g., DRAM) and address circuitry (e.g., a row decoder and a column decoder) that can receive an address from the memory sub-system controller 114 and decode the address to access the non-volatile memory devices 120.

Figure 2:
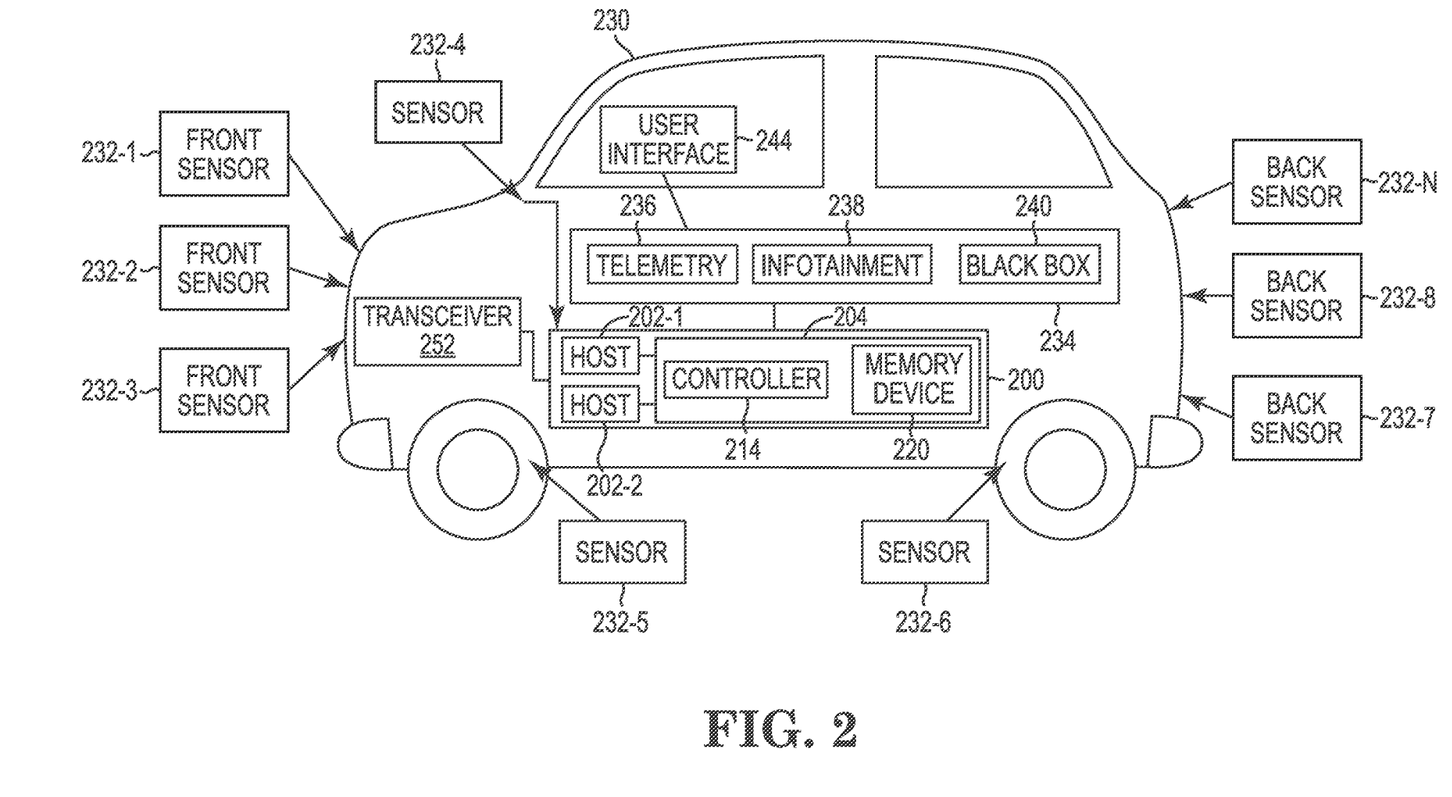
FIG. 2 illustrates an example of a system including a computing system in a vehicle in accordance with some embodiments of the present disclosure.

FIG. 2 illustrates an example of a system including a computing system 200 in a vehicle 230 in accordance with some embodiments of the present disclosure. The computing system 200 can include a memory sub-system 204, which is illustrated as including a controller 214 and non-volatile memory device 220 for simplicity but is analogous to the memory sub-system 104 illustrated in FIG. 1. The memory sub-system 204 is coupled to multiple host systems 202-1, 202-2 via multiple ports.

The computing system 200, and thus the hosts 202, can be coupled to a number of sensors 232 either directly, as illustrated for the sensor 232-4 or via a transceiver 252 as illustrated for the sensors 232-1, 232-2, 232-3, 232-5, 232-6, 232-7, 232-8, . . . , 232-N. The transceiver 252 is able to receive data from the sensors 232 wirelessly, such as by radio frequency communication. In at least one embodiment, each of the sensors 232 can communicate with the computing system 200 wirelessly via the transceiver 252. In at least one embodiment, each of the sensors 232 is connected directly to the computing system 200 (e.g., via wires or optical cables).

The vehicle 230 can be a car (e.g., sedan, van, truck, etc.), a connected vehicle (e.g., a vehicle that has a computing capability to communicate with an external server), an autonomous vehicle (e.g., a vehicle with self-automation capabilities such as self-driving), a drone, a plane, a ship, and/or anything used for transporting people and/or goods. The sensors 232 are illustrated in FIG. 2 as including example attributes. For example, sensors 232-1, 232-2, and 232-3 are cameras collecting data from the front of the vehicle 230. Sensors 232-4, 232-5, and 232-6 are microphone sensors collecting data from the from the front, middle, and back of the vehicle 230. The sensors 232-7, 232-8, and 232-N are cameras collecting data from the back of the vehicle 230. As another example, the sensors 232-5, 232-6 are tire pressure sensors. As another example, the sensor 232-4 is a navigation sensor, such as a global positioning system (GPS) receiver. As another example, the sensor 232-6 is a speedometer. As another example, the sensor 232-4 represents a number of engine sensors such as a temperature sensor, a pressure sensor, a voltmeter, an ammeter, a tachometer, a fuel gauge, etc. As another example, the sensor 232-4 represents a camera. Video data can be received from any of the sensors 232 associated with the vehicle 230 comprising cameras. In at least one embodiment, the video data can be compressed by the hosts 202 before providing the video data to the memory sub-system 204.

The hosts 202 can execute instructions to provide an overall control system and/or operating system for the vehicle 230. The hosts 202 can be controllers designed to assist in automation endeavors of the vehicle 230. For example, the hosts 202 can be ADAS controllers. An ADAS can monitor data to prevent accidents and provide warning of potentially unsafe situations. For example, the ADAS can monitor sensors in the vehicle 230 and take control of vehicle 230 operations to avoid accident or injury (e.g., to avoid accidents in the case of an incapacitated user of a vehicle). The hosts 202 may need to act and make decisions quickly to avoid accidents. The memory sub-system 204 can store reference data in the non-volatile memory device 220 such that data from the sensors 232 can be compared to the reference data by the hosts 202 in order to make quick decisions.

The hosts 202 can write data received from one or more sensors 232 and store the data (e.g., in association with a black box application 240 for the vehicle). The black box application 240 may also be referred to as an accident data recorder. With the advent of autonomous vehicles, some autonomous driving requires real time buffering of telemetric data such as video cameras, RADAR, LIDAR, ultrasonic and other sensors necessary to playback the sequences preceding an accident. Upon an event, a quantity (e.g., thirty seconds) of playback time immediately preceding an event needs to be captured to determine the cause of an incident. A playback may be referred to as a "snapshot". The application that controls storage of such information is referred to herein as a black box. A black box may need to store at least a few, most recent snapshots.

The hosts 202 can execute instructions to provide a set of applications 234 for the vehicle 230 including telemetry 236, infotainment 238, and a black box 240. The telemetry application 236 can provide information displayable on a user interface 244 such as may be associated with the instrumentation and/or dashboard of a vehicle 230. An example of such telemetric information is the speed at which the vehicle 230 is traveling (e.g., based at least in part on data from a sensor 232). The infotainment application 238 can include information and/or entertainment for a user of the vehicle 230 displayable or interfaced via the user interface 244. Examples of such information and/or entertainment include music, movies, GPS information such as a moving map, etc. The memory sub-system 204 can provide storage for any of the set of applications 234. The set of applications 234 can be virtualized, as described with respect to FIG. 2, with backing storage provided by the memory sub-system 204.

FIG. 3 is a block diagram of an example of a system including multiple hosts 302-1, 302-2 and multiple memory devices 318-1, 318-2, 320-1, 320-2 in accordance with some embodiments of the present disclosure. Embodiments are not limited to the specific quantity of hosts 302 and/or memory devices 318, 320 illustrated in FIG. 3. Each of the hosts 302 can be configured to provide a respective ADAS for a vehicle, such as the vehicle 230 illustrated in FIG. 2. Examples of ADAS include automated lighting, adaptive cruise control, traffic, obstacle, and/or collision avoidance, navigation, and lane departure warning and/or centering, among others. An example of a host 302 is an SOC. Host data may be referred to herein as SOC data. The hosts 302 can be coupled to each other, for example, via an interprocess communication network (IPC). Each host 302 can have at least four ports: two for connecting to different first memory devices 318-1, 318-2 and two for connecting to different second memory devices 320-1, 320-2. The terminals of the arrows between the hosts 302 and the memory devices 318, 320 in FIG. 3 represent ports.

The system can include multiple first memory devices 318-1, 318-2 configured to provide primary storage of data. The first memory devices 318 may be referred to herein as primary storage memory devices 318. Primary storage is a term of art that may also be referred to as main memory. Primary storage is typically accessible by a processor for execution of instructions and is typically provided by volatile memory. Examples of primary storage include cache memory, processor registers, and main memory, such as DRAM. Each of the first memory devices 318 includes multiple ports, each coupled to a respective host 302 so that multiple hosts 302 can be coupled to each first memory device 318. For example, the memory device 318-1 can include a port coupled to the host 302-1 and a different port coupled to the host 302-2.

In some embodiments, the ports of the first memory devices 318 can be PCIe interfaces operated according to a compute express link (CXL) protocol. CXL is a high-speed processor-to-device and processor-to-memory interconnect designed to accelerate next-generation data center performance. CXL technology maintains memory coherency between the processor memory space and memory on attached devices, which allows resource sharing for higher performance, reduced software stack complexity, and lower overall system cost. CXL is designed to be an industry open standard interface for high-speed communications, as accelerators are increasingly used to complement processors in support of emerging applications such as artificial intelligence and machine learning. CXL technology is built on the PCIe infrastructure, leveraging PCIe physical and electrical interfaces to provide advanced protocol in areas such as input/output protocol, memory protocol (e.g., initially allowing a host to share memory with an accelerator), and coherency interface. However, in contrast to a CXL switch, which connects multiple different memory devices through a switching fabric, embodiments of the present disclosure avoid the use of a switching fabric by employing multiport memory devices.

The system can include multiple second memory devices 320-1, 320-2 configured to provide secondary storage of data. The second memory devices 320 may be referred to herein as secondary storage memory devices 320. Secondary storage is a term of art that that may also be referred to as auxiliary storage. Secondary storage is typically not directly accessible by a processor and is typically provided by non-volatile memory. Examples of secondary storage include hard drives, SSDs, optical storage, and flash drives. Each of the second memory devices 320 includes multiple ports, each coupled to a respective host 302 so that multiple hosts 302 can be coupled to each second memory device 320. For example, the memory device 320-1 can include a port coupled to the host 302-1 and a different port coupled to the host 302-2. In some embodiments, the ports of the second memory devices 320 can be PCIe interfaces operated according to an NVMe protocol.

At least one of the hosts 302 can be configured to check a functionality of the first memory devices 318-1, 318-2 and/or the second memory devices 320-1, 320-2. With respect to the second memory devices 320, the functionality check can also include a data integrity check to determine whether persistent data has been corrupted (in addition to determining whether the second memory device 320 itself is functional). The hosts 302 can be configured to perform the functionality check at initialization of the host 302 and/or in response to an error during runtime. In some embodiments, at least one of the hosts 302 (or all of the hosts) can be configured to check the functionality of all of the memory devices 318, 320 in the system. In some embodiments, the host 302-1 can be configured to perform a functionality check on the memory device 318-1 and the memory device 320-1 and the host 302-2 can be configured to perform a functionality check on the memory device 318-2 and the memory device 320-2. In response to the failure of one of the hosts 302, a different host 302 can be configured to reinitialize and check the functionality of any or all memory devices 318, 320 to which the different host 302 is coupled. In response to the failure of a memory device 318, 320, a host 302 can reinitialize and check the functionality of any other (in some embodiments, every other) memory device 318, 320 with which it is coupled.

Each of the hosts 302 can be configured to use a respective one of the first memory devices 318 for primary storage of data in response to the respective first memory device 318 passing the functionality check. Likewise, each of the hosts 302 is configured to use a respective one of the second memory devices 320 for secondary storage of data in response to the respective second memory device 320 passing the functionality check. For example, in normal operating conditions (e.g., where the memory devices 318, 320 pass the functionality check), the host 302-1 is configured to use the memory device 318-1 for primary storage and the memory device 320-1 for secondary storage while the host 302-2 is configured to use the memory device 318-2 for primary storage and the memory device 320-2 for secondary storage.

Each of the hosts 302 can be configured to use a different one of the second memory devices 320 for backup secondary storage. For example, the host 302-1 can be configured to use the memory device 320-1 for secondary storage and the memory device 320-2 for backup secondary storage and the host 302-2 can be configured to use the memory device 320-2 for secondary storage and the memory device 320-1 for backup secondary storage. Backup secondary storage refers to backing up the data sored in secondary storage, such as by mirroring data to the memory devices 320, among other data backup operations. Data can be retrieved by a host 302 from one of the memory devices 320 in response to a failure of another of the memory devices 320. For example, the host 302-1 can retrieve data from the memory device 320-2 in response to a failure of the memory device 320-1.

Each of the hosts 302 can be configured to use a different one of the first memory devices 318 for primary storage in response to the respective first memory device 318, which the host 302 is normally configured to use, failing the functionality check. For example, the host 302-1 can use the memory device 318-2 for primary storage in response to the memory device 318-1 failing the functionality check. Each of the hosts 302 can be configured to use a different one of the second memory devices 320 for secondary storage in response to the respective second memory device 320, which the host 302 is normally configured to use, failing the functionality check. For example, the host 302-1 can use the memory device 320-2 for secondary storage in response to the memory device 320-1 failing the functionality check. In such a situation, a different host 302 can still be configured to use the different first memory device 318 for primary storage and/or second memory device 320 for secondary storage. Continuing the example above, the host 302-2 would also use the memory device 318-2 for primary storage and the memory device 320-2 for secondary storage even though the host 302-1 has switched to using those same memory devices 318-2, 320-2 for primary and secondary storage, respectively.

In the event that a primary storage memory device 318-1 fails a functionality check and the host 302-1 that would normally use that primary storage memory device 318-1 uses a different primary storage memory device 318-2 associated with a different host 302-2, some of the ADAS functionality provided by either host 302-1, 302-2 may be degraded or stopped in order not to cause a failure of the different primary storage memory device 318-2, which could lead to broader system failures. The overall vehicle system and/or hosts 302 can implement policies to determine which ADAS functionalities are scaled down or stopped first if a primary storage device 318 becomes oversubscribed.

In the event that a secondary storage memory device 320-1 fails a functionality check and the host 302-1 that would normally use that secondary storage memory device 320-1 uses a different secondary storage memory device 320-2 associated with a different host 320-2, some of the ADAS functionality provided by either host 302-1, 302-2 may be degraded or stopped in order not to cause a failure of the different secondary storage memory device 320-2, which could lead to broader system failures. The overall vehicle system and/or hosts 302 can implement policies to determine which ADAS functionalities are scaled down or stopped first if a secondary storage device 320 becomes oversubscribed.

In the event that some data is corrupted in a secondary storage memory device 320-1, that data can be recovered from a different secondary storage memory device 320-2 if it is backed up therein. The host 302-1 associated with the secondary storage memory device 320-1 that stores the data that has been corrupted can recover the backup data directly from the different secondary storage memory device 320-2 without interrupting a different host 302-2.

In the event that a host 302-1 fails and a primary storage memory device 318-2 associated with a different host 302-2 fails, the different host 302-2 can use the primary storage device 318-1 associated with the host 302-1 that failed. The ADAS functionality associated with the host 302-1 that failed may be lost, but the ADAS functionality associated with the different host 302-2 can continue.

Figure 4:
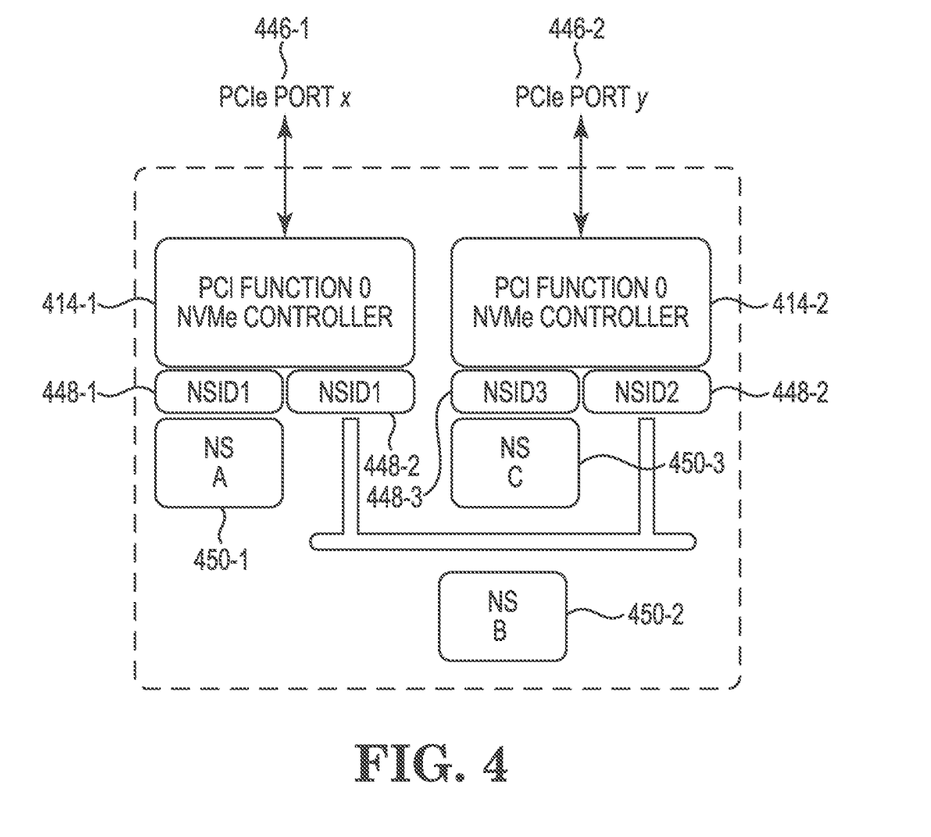
FIG. 4 is a block diagram of an example of a peripheral component interconnect express fabric in accordance with some embodiments of the present disclosure.

FIG. 4 is a block diagram of an example of a peripheral component interconnect express fabric in accordance with some embodiments of the present disclosure. The dotted line represents a memory device (e.g., a non-volatile memory device), such as memory device 320-1 illustrated in FIG. 3. The memory device includes a first port 446-1 ("PCIe Port x") and a second port 446-2 ("PCIe Port y"). The ports 446 can be associated with the same root complex or with different root complexes and may be used to implement multi-path input/output and/or input/output sharing architectures. A root complex device can couple a processor and memory sub-system to the PCIe switch fabric.

Each port 446 is coupled to a respective controller 414-1, 414-2. Each controller 414 is illustrated in association with various namespace identifiers ("NSID"). For example, the first controller 414-1 is associated with NSID 1 448-1 and NSID 2 448-2 and the second controller 414-2 is associated with NSID 3 448-3 and NSID 2 448-2. An NSID is roughly analogous to a partition in an SSD. The first controller 414-1 can control the first namespace ("NS A") 450-1, the second controller 414-2 can control the third namespace ("NS C") 450-3, and both controllers 414-1, 414-2 can control the second namespace ("NS B") 450-2. The namespaces can be created by the controllers 414 and the second namespace 450-2 represents a shared namespace between the controllers 414. Each namespace can refer to a portion of the memory capacity represented by a collection of LBAs.

Figure 5:
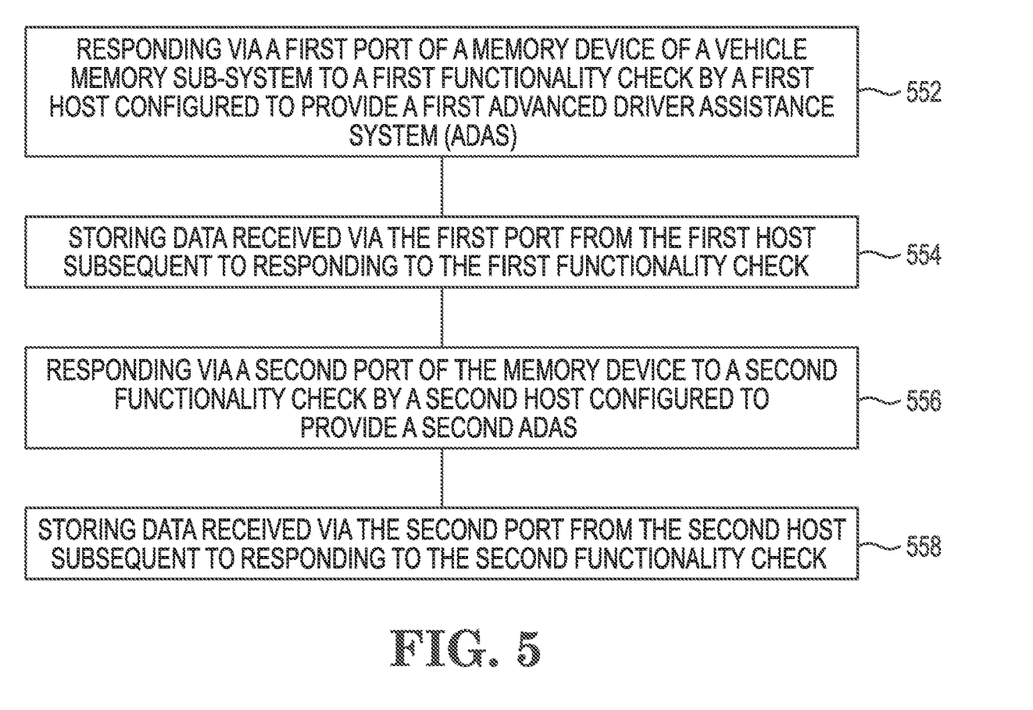
FIG. 5 is a flow diagram of an example method for redundant multiport memory for vehicle applications in accordance with some embodiments of the present disclosure.

FIG. 5 is a flow diagram of an example method for redundant multiport memory for vehicle applications in accordance with some embodiments of the present disclosure. The method can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At block 552 in the example method of FIG. 5, a memory device of a vehicle memory sub-system can respond via a first port of the memory device to a first functionality check by a first host. The first host is configured to provide a first ADAS.

At block 554 in the example method of FIG. 5, data received via the first port from the first host can be stored by the memory device subsequent to responding to the first functionality check. In at least one embodiment, the memory device provides primary storage of data for the first host by storing data received via the first port. In at least one embodiment, the memory device provides secondary storage of data for the first host by storing data received via the first port.

At block 556 in the example method of FIG. 5, the memory device can respond via a second port of the memory device to a second functionality check by a second host. The second host is configured to provide a second ADAS. The second functionality check by the second host can be performed in response to a failure of a different memory device coupled to the second host.

At block 558 in the example method of FIG. 5, data received via the second port from the second host can be stored by the memory device subsequent to responding to the second functionality check. In at least one embodiment, the memory device provides primary storage of data for the second host by storing data received via the second port. In at least one embodiment, the memory device provides secondary storage of data for the second host by storing data received via the second port. In at least one embodiment, the memory device provides backup secondary storage of data for by storing data received via the second port.

Figure 6:
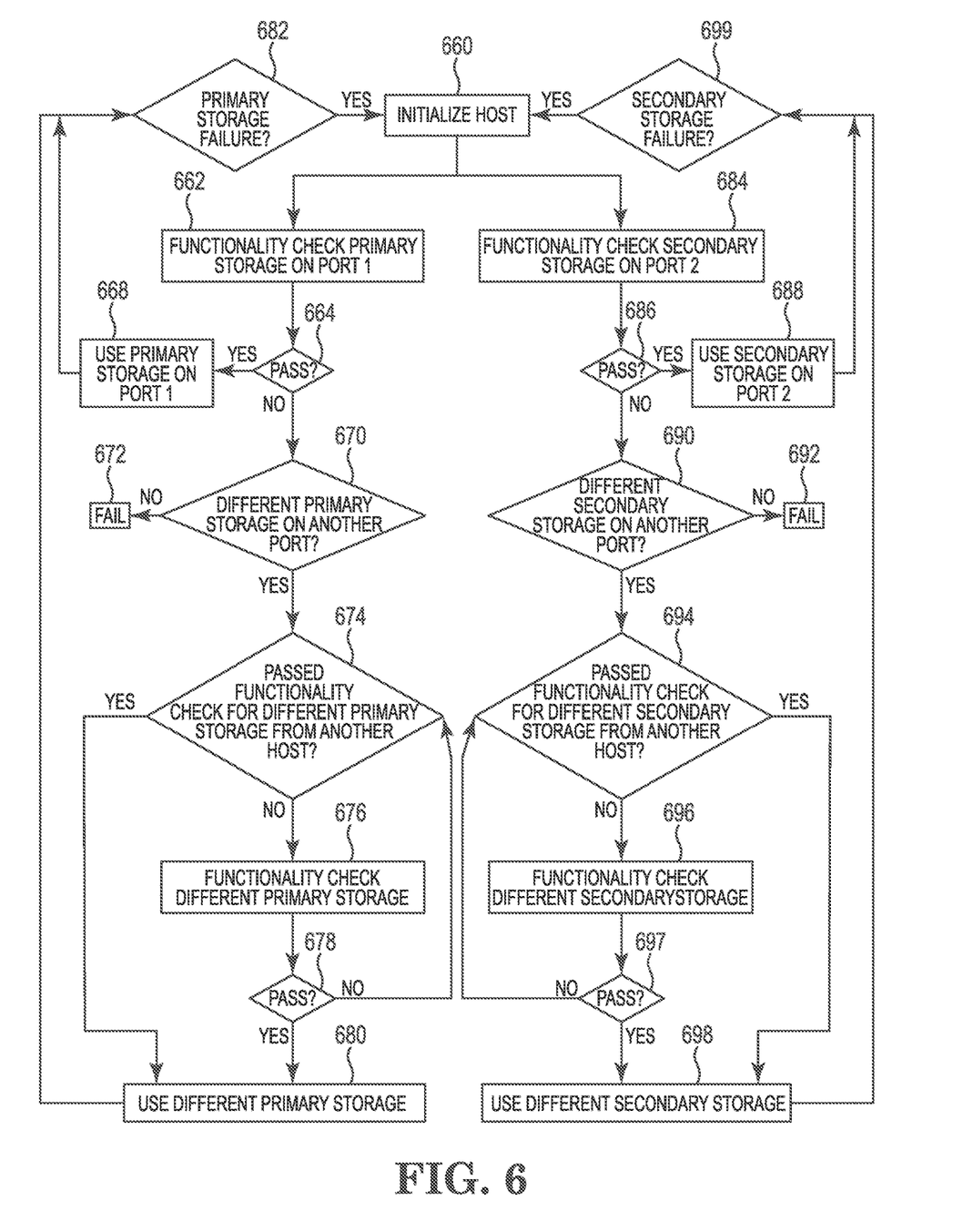
FIG. 6 is a flow diagram of an example method for redundant multiport memory for vehicle applications in accordance with some embodiments of the present disclosure.

FIG. 6 is a flow diagram of an example method for redundant multiport memory for vehicle applications in accordance with some embodiments of the present disclosure. As used with respect to FIG. 6, the term "primary storage" is short for a primary storage memory device and the term "secondary storage" is short for a secondary storage memory device. The method can start at block 660, where one or more hosts are initialized. An initialized host can perform a functionality check on primary storage on Port 1 of the host as indicated at block 662. If the primary storage on Port 1 passes the functionality check as indicated by the "YES" path from block 664, then the host can use the primary storage on Port 1 as indicated at block 668 unless and until the host detects a failure of the primary storage on Port 1 as indicated at block 682. In such an instance, the host can reinitialize as indicated at block 660.

If the primary storage on Port 1 fails the functionality check as indicated by the "NO" path from block 664, then the host can determine whether a different primary storage is available on another port of the host as indicated at block 670. If a different primary storage is not available as indicated by the "NO" path from block 670, then operations of the host can fail as indicated at block 672.

However, if a different primary storage is available on another port of the host as indicated by the "YES" path from block 670, then the host can determine whether the different primary storage passed a functionality check by another host as indicated at block 674. For example, a different host associated with the different primary storage may have already performed such a functionality check on the different primary storage, obviating the need for the host to do so, which is indicated by the "YES" path from block 674. In such an instance, the host can use the different primary storage on the different port as indicated at block 680 unless and until the host detects a failure of the primary storage on the different port (e.g., Port 3) as indicated at block 682. In such an instance, the host can reinitialize as indicated at block 660.

If the different primary storage has not passed a functionality check by another host (or if the host cannot make such a determination) as indicated by the "NO" path from block 674, then the host can perform a functionality check on the different primary storage as indicated at block 676. If the different primary storage fails the functionality check as indicated by the "NO" path from block 678, then the host can determine whether a different primary storage is available on another port as indicated at block 670. However, if the different primary storage passes the functionality check as indicated by the "YES" path from block 678, then the host can use the different primary storage as indicated at block 680 unless and until the host detects a failure of the different primary storage on the different port (e.g., Port 3) as indicated at block 682. In such an instance, the host can reinitialize as indicated at block 660.

Returning to block 660, an initialized host can perform a functionality check on secondary storage on Port 2 of the host as indicated at block 684. If the secondary storage on Port 2 passes the functionality check as indicated by the "YES" path from block 686, then the host can use the secondary storage on Port 2 as indicated at block 688 unless and until the host detects a failure of the secondary storage on Port 2 as indicated at block 699. In such an instance, the host can reinitialize as indicated at block 660.

If the secondary storage on Port 2 fails the functionality check as indicated by the "NO" path from block 686, then the host can determine whether a different secondary storage is available on another port of the host as indicated at block 690. If a different secondary storage is not available as indicated by the "NO" path from block 690, then operations of the host can fail as indicated at block 692.

However, if a different secondary storage is available on another port of the host as indicated by the "YES" path from block 690, then the host can determine whether the different secondary storage passed a functionality check by another host as indicated at block 694. For example, a different host associated with the different secondary storage memory device may have already performed such a functionality check on the different secondary storage, obviating the need for the host to do so, which is indicated by the "YES" path from block 694. In such an instance, the host can use the different secondary storage on the different port as indicated at block 698 unless and until the host detects a failure of the secondary storage on the different port (e.g., Port 4) as indicated at block 699. In such an instance, the host can reinitialize as indicated at block 660.

If the different secondary storage has not passed a functionality check by another host (or if the host cannot make such a determination) as indicated by the "NO" path from block 694, then the host can perform a functionality check on the different secondary storage as indicated at block 696. If the different secondary storage fails the functionality check as indicated by the "NO" path from block 697, then the host can determine whether a different secondary storage is available on another port as indicated at block 690. However, if the different secondary storage passes the functionality check as indicated by the "YES" path from block 697, then the host can use the different secondary storage as indicated at block 698 unless and until the host detects a failure of the different secondary storage on the different port (e.g., Port 4) as indicated at block 699. In such an instance, the host can reinitialize as indicated at block 660.

Instructions can be executed by a processing device (e.g., one or more general-purpose processing devices such as a microprocessor, a central processing unit, or the like). More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. The processing device can also be one or more special-purpose processing devices such as an ASIC, an FPGA, a digital signal processor (DSP), network processor, or the like. The processing device is configured to execute instructions for performing the operations and steps discussed herein. In some embodiments, the instructions can be communicated over a network interface device to communicate over a network.

A machine-readable storage medium (also known as a computer-readable medium) can store one or more sets of instructions or software embodying one or more of the methodologies or functions described herein. The instructions can also reside, completely or at least partially, within main memory and/or within a processing device during execution thereof by a computing system. The main memory and the processing device can also constitute machine-readable storage media.

The term "machine-readable storage medium" should be taken to include a single medium or multiple media that store the one or more sets of instructions. The term "machine-readable storage medium" should also be taken to include a medium that is capable of storing or encoding a set of instructions for execution by the machine and that cause the machine to perform one or more of the methodologies of the present disclosure. The term "machine-readable storage medium" should accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a machine-readable storage medium, such as, but not limited to, types of disks, semiconductor-based memory, magnetic or optical cards, or other types of media suitable for storing electronic instructions.

The present disclosure can be provided as a computer program product, or software, that can include a machine-readable medium having stored thereon instructions, which can be used to program a computer system (or other electronic devices) to perform a process according to the present disclosure. A machine-readable medium includes a mechanism for storing information in a form readable by a machine (e.g., a computer).

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. An apparatus, comprising:
 a plurality of hosts, each configured to provide a respective advanced driver assistance system (ADAS) for a vehicle;
 a plurality of first memory devices configured to provide primary storage of data, each first memory device having a respective plurality of first ports, each first port coupled to a respective one of the plurality of hosts; and
 a plurality of second memory devices configured to provide secondary storage of data, each second memory device having a plurality of second ports, each second port coupled to a respective one of the plurality of hosts;
 wherein at least one of the plurality of hosts is configured to check a functionality of the plurality of first memory devices and the second plurality of memory devices.

2. The apparatus of claim 1, wherein each of the plurality of hosts is configured to:
 use a respective one of the plurality of first memory devices for primary storage of data in response to the respective one of the plurality of first memory devices passing the check; and
 use a respective one of the plurality of second memory devices for secondary storage of data in response to the respective one of the plurality of second memory devices passing the check.

3. The apparatus of claim 2, wherein each of the plurality of hosts is configured to:
 use a different one of the plurality of first memory devices for primary storage of data in response to the respective one of the plurality of first memory devices failing the check; and
 use a different one of the plurality of second memory devices for secondary storage of data in response to the respective one of the plurality of second memory devices failing the check.

4. The apparatus of claim 3, wherein a different one of the plurality of hosts is configured to:
 use the different one of the plurality of first memory devices for primary storage of data; and
 use the different one of the plurality of second memory devices for secondary storage of data.

5. The apparatus of claim 1, wherein the at least one of the plurality of hosts is configured to check the functionality of the plurality of first memory devices and the second plurality of memory devices at initialization of the at least one of the plurality of hosts and in response to an error during runtime.

6. An apparatus, comprising:
 a first system-on-a-chip (SOC) configured to provide a first advanced driver assistance system (ADAS);
 a second SOC configured to provide a second ADAS;
 a first memory device configured to provide primary storage of data, the first memory device having a first port coupled to the first SOC and a second port coupled to the second SOC;
 a second memory device configured to provide secondary storage of data, the second memory device having a first port coupled to the first SOC and a second port coupled to the second SOC;
 a third memory device configured to provide primary storage of data, the third memory device having a first port coupled to the first SOC and a second port coupled to the second SOC; and
 a fourth memory device configured to provide secondary storage of data, the fourth memory device having a first port coupled to the first SOC and a second port coupled to the second SOC;
 wherein, during initialization, the first SOC is configured to check a functionality of the first memory device and the second memory device; and
 wherein, during initialization, the second SOC is configured to check a functionality of the third memory device and the fourth memory device.

7. The apparatus of claim 6, wherein, during initialization, the first SOC is further configured to check the functionality of the third memory device and the fourth memory device.

8. The apparatus of claim 6, wherein the first SOC is configured to:
 use the first memory device in response to the first memory device passing the check;

use the second memory device in response to the second memory device passing the check;

use the third memory device in response to the first memory device failing the check and the third memory device passing the check; and use the fourth memory device in response to the second memory device failing the check and the fourth memory device passing the check.

9. The apparatus of claim 8, wherein the second SOC is configured to:

use the third memory device in response to the third memory device passing the check;

use the fourth memory device in response to the fourth memory device passing the check;

use the first memory device in response to the third memory device failing the check and the first memory device passing the check; and use the second memory device in response to the fourth memory device failing the check and the second memory device passing the check.

10. The apparatus of claim 9, wherein the first SOC is coupled to the second SOC via an inter-process communication network.

11. The apparatus of claim 10, wherein the first SOC is configured to reinitialize and check the functionality of the first memory device, the second memory device, the third memory device, and the fourth memory device in response to a failure of the second SOC.

12. The apparatus of claim 6, wherein the first SOC is configured to store first SOC data in the second memory device and to backup the first SOC data in the fourth memory device; and wherein the second SOC is configured to store second SOC data in the fourth memory device and backup the second SOC data in the second memory device.

13. The apparatus of claim 12, wherein the first port and the second port of the second memory device and the first port and the second port of the fourth memory device comprise peripheral compute interface express (PCIe) interfaces operated according to a non-volatile memory device express (NVMe) protocol; and wherein the first port and the second port of the first memory device and the first port and the second port of the third memory device comprise peripheral compute interface express (PCIe) interfaces operated according to a compute express link (CXL) and protocol.

14. The apparatus of claim 12, wherein the first SOC is configured to retrieve the first SOC data from the fourth memory device in response to a failure of the second memory device.

15. The apparatus of claim 6, wherein the first SOC is configured to reinitialize and check the functionality of the first memory device, the second memory device, the third memory device, and the fourth memory device in response to a failure of the first memory device or the second memory device.

16. A method, comprising:

responding via a first port of a memory device of a vehicle memory sub-system to a first functionality check by a first host configured to provide a first advanced driver assistance system (ADAS);

storing data received via the first port from the first host subsequent to responding to the first functionality check;

responding via a second port of the memory device to a second functionality check by a second host configured to provide a second ADAS; and storing data received via the second port from the second host subsequent to responding to the second functionality check.

17. The method of claim 16, wherein storing data received via the first port comprises providing primary storage of data.

18. The method of claim 17, wherein storing data received via the second port comprises providing primary storage of data; and wherein the second functionality check by the second host in performed in response to a failure of a different memory device coupled to the second host.

19. The method of claim 16, wherein storing data received via the first port comprises providing secondary storage of data.

20. The method of claim 19, wherein storing data received via the second port comprises providing backup secondary storage of data.

* * * * *